(12) United States Patent
Scott et al.

(10) Patent No.: US 10,941,892 B2
(45) Date of Patent: Mar. 9, 2021

(54) VALVED CONNECTOR

(71) Applicant: Hewlett Packard Enterprise Development LP, Houston, TX (US)

(72) Inventors: Michael Scott, Chippewa Falls, WI (US); Steven J. Dean, Chippewa Falls, WI (US); Harvey J. Lunsman, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/789,741

(22) Filed: Oct. 20, 2017

(65) Prior Publication Data

US 2018/0238480 A1    Aug. 23, 2018

Related U.S. Application Data

(60) Provisional application No. 62/460,402, filed on Feb. 17, 2017.

(51) Int. Cl.
| | |
|---|---|
| *F16L 37/36* | (2006.01) |
| *F16L 37/14* | (2006.01) |
| *F16L 37/086* | (2006.01) |
| *F16L 37/34* | (2006.01) |
| *F16L 37/56* | (2006.01) |

(Continued)

(52) U.S. Cl.
CPC ............. *F16L 37/36* (2013.01); *F16L 37/086* (2013.01); *F16L 37/14* (2013.01); *F16L 37/34* (2013.01); *F16L 37/56* (2013.01); *F16L 37/006* (2013.01); *F16L 37/35* (2013.01)

(58) Field of Classification Search
CPC . F16L 29/04; F16L 37/02; F16L 37/04; F16L 37/28; F16L 37/30; F16L 37/32; F16L 37/34–37/36; Y10T 137/87925; Y10T 137/87941; Y10T 137/87949; Y10T 137/87957; Y10T 137/87965; Y10T 137/87973; F16K 15/021; F16K 15/025; F16K 15/026; F16K 15/06; F16K 15/063
See application file for complete search history.

(56) References Cited

U.S. PATENT DOCUMENTS

| | | |
|---|---|---|
| 2,457,251 A | 12/1948 | Main, Jr. |
| 4,982,761 A | 1/1991 | Kreczko et al. |

(Continued)

FOREIGN PATENT DOCUMENTS

| | | | |
|---|---|---|---|
| DE | 4025488 C2 * | 4/1998 | ........... F16K 15/026 |
| EP | 0452670 A2 | 3/1991 | |

(Continued)

*Primary Examiner* — Hailey K. Do
(74) *Attorney, Agent, or Firm* — Sunstein Kann Murphy & Timbers LLP

(57) ABSTRACT

Male and female fittings are configured to mate to form a valved connector system. Some embodiments of the female fitting include movable poppet configured to sealingly engage a flared projection within the female fitting. Some embodiments of the male fitting include a male mating aperture, and a movable plug configured to sealingly engage the male mating aperture. When the female fitting is mated with a male fitting, the male fitting forces the poppet to disengage from the flared projection, and the flared projection forces the plug to recede into the male fitting, to open a fluid path through the valved connector system.

20 Claims, 17 Drawing Sheets

(51) Int. Cl.
*F16L 37/00* (2006.01)
*F16L 37/35* (2006.01)

(56) References Cited

U.S. PATENT DOCUMENTS

| | | | | |
|---|---|---|---|---|
| 5,307,830 | A | * | 5/1994 | Welker .................... F16K 47/08 |
| | | | | 137/1 |
| 6,047,903 | A | * | 4/2000 | Meyer .................... F15D 1/001 |
| | | | | 239/524 |
| 6,176,263 | B1 | * | 1/2001 | Lacroix .................. F16L 29/04 |
| | | | | 137/614 |
| 6,354,564 | B1 | | 3/2002 | Van Scyoc et al. |
| 9,080,712 | B2 | * | 7/2015 | Tiberghien ............... F16L 55/10 |
| 2002/0148514 | A1 | * | 10/2002 | Taneya .................... F16L 37/23 |
| | | | | 137/614.03 |
| 2003/0178592 | A1 | * | 9/2003 | Boger .................... F16K 47/08 |
| | | | | 251/118 |
| 2007/0274772 | A1 | * | 11/2007 | Tiberghien ............ F16L 37/107 |
| | | | | 403/300 |
| 2016/0061370 | A1 | * | 3/2016 | Gennasio ................ F16L 37/34 |
| | | | | 251/58 |
| 2017/0350547 | A1 | * | 12/2017 | Tiberghien .............. F16L 37/34 |

FOREIGN PATENT DOCUMENTS

| | | | | | |
|---|---|---|---|---|---|
| GB | | 1017262 | A | * | 1/1966 ............. F16L 29/04 |
| GB | | 1152093 | A | * | 5/1969 ............. F16L 19/02 |
| WO | WO-9729318 | A1 | * | 8/1997 ............. F16L 29/04 |
| WO | WO-2012136891 | A1 | * | 10/2012 ........... F16L 55/033 |

* cited by examiner

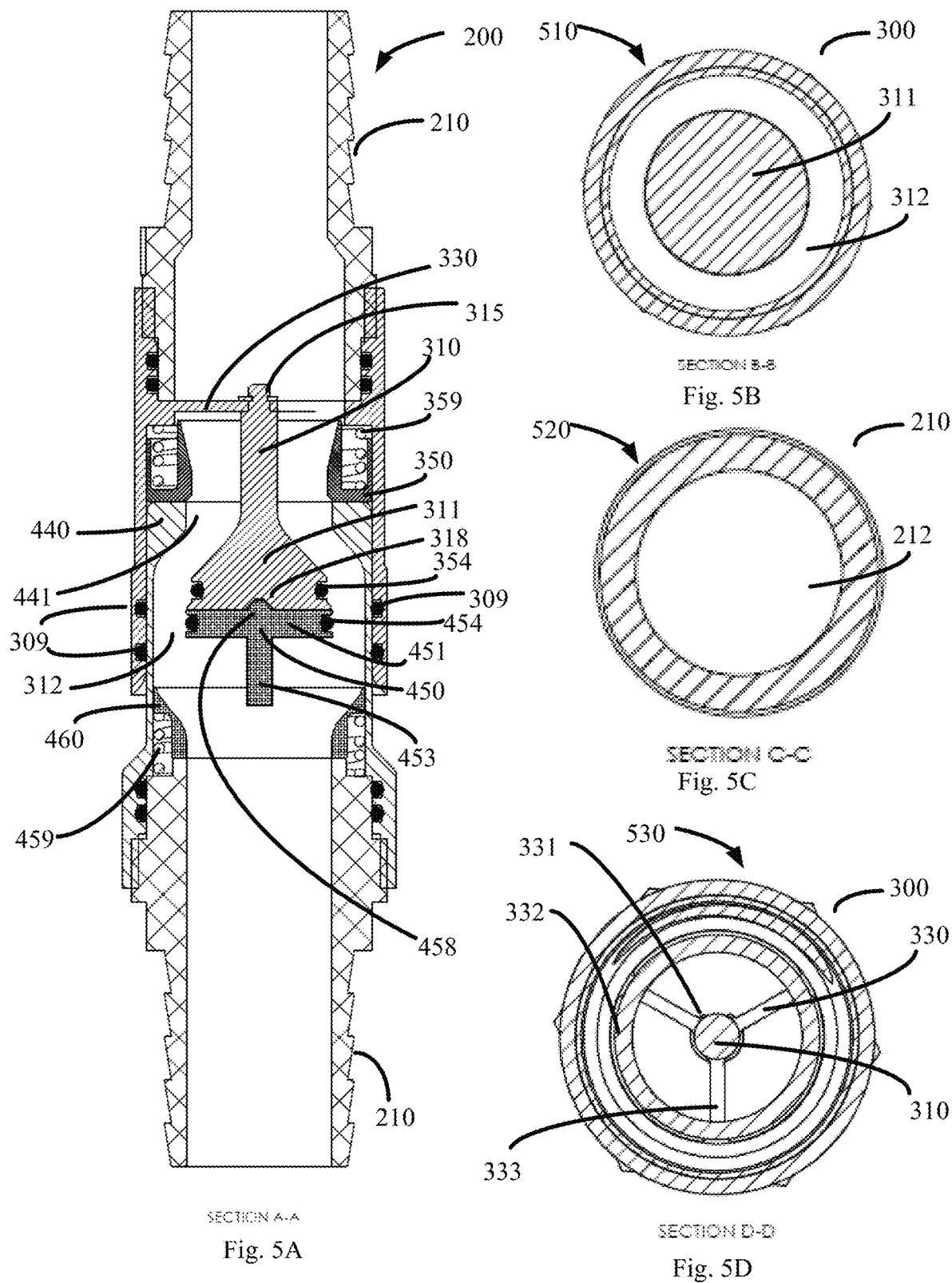

Fig. 6A: Small

Fig. 6B: Medium

Fig. 6C: Large

Fig. 6D: Extra Large

VALVED CONNECTOR

RELATED APPLICATION

The present invention claims priority to U.S. provisional patent application Ser. No. 62/460,402, filed Feb. 17, 2017, titled "Valved Connector," the content of which is incorporated herein by reference, in its entirety.

BACKGROUND ART

Some high performance computer systems have a liquid cooling conduit that flows a cooling fluid around heat-producing components. Heated fluid carries thermal energy away from the system, and is replaced by cooler fluid.

SUMMARY OF THE EMBODIMENTS

In some embodiments, quick-connect and quick-disconnect systems allow one fluid conduit to be connected to, and disconnected from, another fluid conduit quickly and easily. To that end, some embodiments include fixtures configured to mate with one another to complete a fluid connection such that the respective conduits are in fluid communication with each other when the fixtures are mated.

In illustrative embodiments, two fittings are configured to mate to form a valved connector. The fittings are easy to connect and disconnect from one another. Each fitting includes a fluid interface and a valve mechanism configured to automatically seal its fluid interface when the fittings are disconnected, or in the process of being disconnected. The fittings and valve mechanisms are configured to present, to a fluid flowing through the fittings, a cross-section having a constant area through the connector so as to mitigate creation of turbulence in the fluid.

In accordance with one embodiment, two barrels cooperate to form a valved connector system. When coupled together, the two barrels define a non-linear fluid flow path along an axis from one end of the valved connector system to the other end. Although the fluid path is non-linear (i.e., a fluid does not flow in a straight line from one end of the valved connector system to the other), the fluid path has cross-sectional area that is constant through the valved connector system.

When the two barrels are not connected to one another, each is sealed by an internal valve mechanism to stop and prevent fluid flow within each of the barrels. When the two barrels are connected to each other, however, the valve mechanisms open to allow fluid to flow along the fluid path.

One of the barrels, which may be referred to as a "female" barrel, has a first fluid interface (e.g., a nozzle) at one end to receive fluid into, or release fluid from, the interior of the female barrel. The first fluid interface has a first cross-sectional area.

The other end of the female barrel has a first mating aperture (or "female mating aperture") that is configured to mate with the second barrel, which may be referred to as a "male" barrel. The female mating aperture has a second radial cross-sectional area that is larger than the first cross-sectional area of the first fluid interface.

A stem is suspended (e.g., by a retaining disk or by a flow straightener) in a fixed position within the female barrel. In other words, the stem does not move along the barrel's axis, relative to other portions of the barrel.

The stem has a flared projection that, together with an inner side wall of the female barrel, defines annular radial volume within the female barrel. The annular radial volume has an area, in cross-section, equal to the first radial cross-sectional area of the first fluid interface.

The female barrel also includes a poppet. The poppet has an annular shape, and is disposed within the female barrel so as to be axially movable along the fluid path. A radial surface of the poppet sealingly engages with the inner side wall of the female barrel, to prevent fluid from flowing between the poppet and the inner side wall.

The female barrel also includes a first (conical) spring configured to bias the poppet to sealingly engage the flared projection of the stem in the annular radial volume between the stem's flared projection and the inner side wall of the female barrel.

The male barrel also has a fluid interface (e.g., a nozzle) at one end to receive fluid into, or release fluid from, the interior of the male barrel. To avoid confusion with the fluid interface of the female barrel, the male interface's fluid interface may be referred to as the "second" fluid interface.

The male barrel also has a mating aperture, which may be referred to as the "second" mating aperture (or "male mating aperture"). The second mating aperture is configured to nestably couple with the first mating aperture. Stated alternately, the female mating aperture is configured to mate with the male mating aperture. One or more O-rings are disposed within the female barrel, so as to engage the outer surface of the male barrel when they are mated, to seal any gap between the outer surface of the male barrel and inner surface of the female barrel. There are no exposed O-rings on the outside of the male barrel. Consequently, the male barrel and female barrel are not engaged with one another, no O-rings are exposed on the environment outside of either barrel.

A plug is movably suspended within the male barrel and is coupled to a funnel. The funnel has a funnel aperture with a cross-section that has an area equal to first radial cross-sectional area of the first fluid interface.

A second spring (which may be cylindrical) within the male barrel is configured to bias the plug to sealingly engage the second mating aperture, so as to seal the male barrel when it is not engaged with the female barrel.

When the female barrel and male barrel are nested to form a fluid coupling, the male barrel forces the poppet in the female barrel to disengage from the flared projection, so as to open a flow path through the annular radial volume. In addition, the stem in the female barrel forces the plug to recede into the male barrel to as to open the flow path through the funnel and male barrel to the second fluid interface. Consequently, when mated together, the female barrel and the male barrel define the non-linear fluid path through the fluid coupling, the non-linear fluid path having a substantially constant cross-section between the first fluid interface and the second fluid interface.

An illustrative embodiment of a valved connector system includes a female barrel having a first mating aperture, and a flared projection suspended within the female barrel, defining a radial volume within the female barrel, and a poppet disposed within the female barrel so as to be axially movable within the female barrel.

The system also includes a male barrel having a second mating aperture configured to nestably couple with the first mating aperture of the female barrel. A plug is movably suspended within the male barrel.

When the female barrel and male barrel are nested, the male barrel forces the poppet to disengage from the flared projection so as to open a flow path through the radial volume, and the flared projection forces the plug to recede into the male barrel so as to open the second mating aperture.

In some embodiments, the female barrel and the male barrel defining a non-linear fluid path having a continuous and substantially constant cross-section normal to the fluid path.

An embodiment of a valved fitting, for use in a connector system, includes a barrel having a first mating aperture, and a flared projection suspended within the barrel and defining a radial volume within the barrel. A poppet is disposed within the barrel so as to be axially movable along an axial fluid path through the barrel. The barrel, flared projection, and poppet are configured such that, when the barrel is coupled to a second fitting, the second fitting forces the poppet to disengage from the flared projection so as to open a flow path through the radial volume. In some embodiments, the barrel, flared projection, and poppet define a fluid path having a substantially constant cross-section.

BRIEF DESCRIPTION OF THE DRAWINGS

The foregoing features of embodiments will be more readily understood by reference to the following detailed description, taken with reference to the accompanying drawings, in which:

FIG. 5A schematically illustrates an embodiment a valved connector system in the open configuration;

FIGS. 5B, 5C and 5D schematically illustrate cross-sections of an embodiment a valved connector system;

FIGS. 6A, 6B, 6C, 6D and 6E schematically illustrate embodiments of flow straighteners;

DETAILED DESCRIPTION OF SPECIFIC EMBODIMENTS

Two fittings 300, 400 are configured to mate to form a valved connector 200. The fittings 300, 400 are easy to connect and disconnect from one another, for example without the use of tools, and/or without turning the fittings 300, 400 with respect to each other (e.g., as in screwing threaded bodies). Moreover, the fittings may be blind mated, meaning that they are configured to be plugged/coupled together and retained in the plugged/coupled state without the need to visually observe the couplers themselves during the plugging/coupling or unplugging/uncoupling process.

Each fitting includes a fluid interface and a valve mechanism configured to automatically seal its fluid interface when the fittings are disconnected, or in the process of being disconnected. The fittings and valve mechanisms are configured to present, to a fluid flowing through the fittings, a cross-section having a constant area through the connector (or, in some embodiments, at least 70%, 80%, or 90% of the fluid path through the connector) so as to mitigate creation or increase of turbulence in the fluid. Some embodiments include flow straighteners 600 to reduce turbulence in fluid entering, flowing through, and/or exiting the connector 200.

Figure 1:
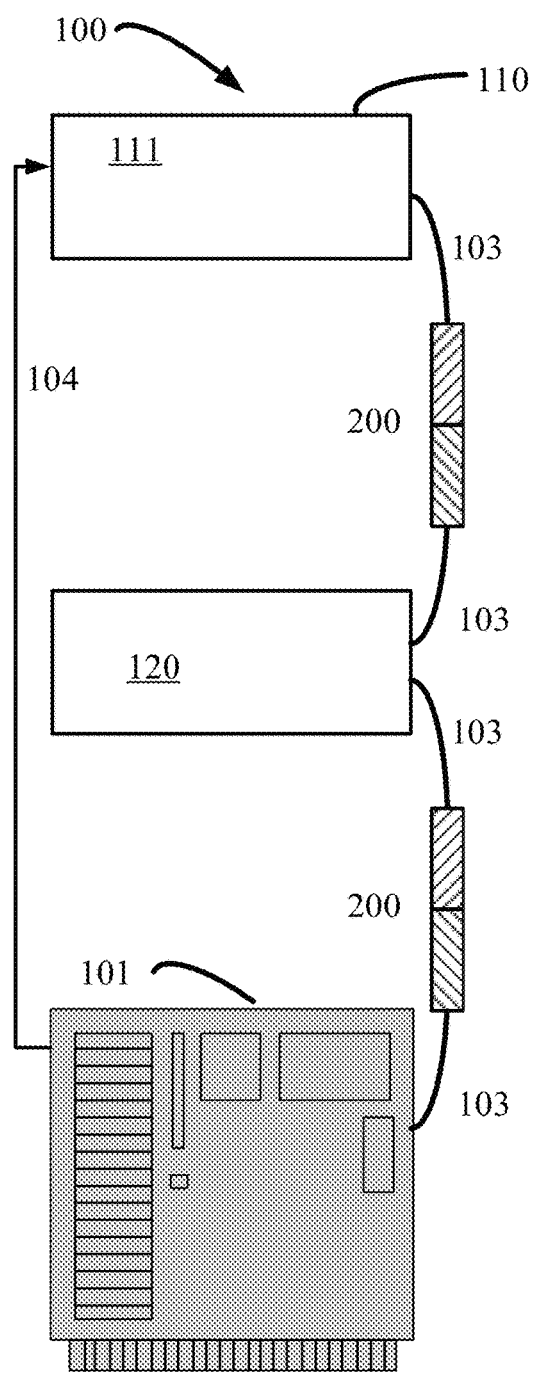
FIG. 1 schematically illustrates an embodiment of a high performance computer with a liquid cooling system.

FIG. 1 schematically illustrates a high performance computer system 100 including a high performance computer 101 with a liquid cooling system. The cooling system receives cooling fluid 111 (e.g., water; glycol; a mixture of water and glycol, etc.) from a cooling fluid source 110 to a pump 120 through a disconnectable valve system 200 via a first fluid conduit 103 and a second fluid conduit 103. The pump 120, in turn, sends the cooling fluid 111 to the high performance computer 101, where the cooling fluid 111 circulates around and/or within the high performance computer 101. In some embodiments, the cooling fluid 111 is returned from the high performance computer 101 to the source 110 via a return conduit 104.

The inventors discovered that turbulence in the cooling fluid 111 provided to the pump 120 may degrade the performance of the pump 120, e.g., by causing cavitation within the pump, and adversely impact the supply of cooling fluid 111 to the computer 101.

Figure 2:
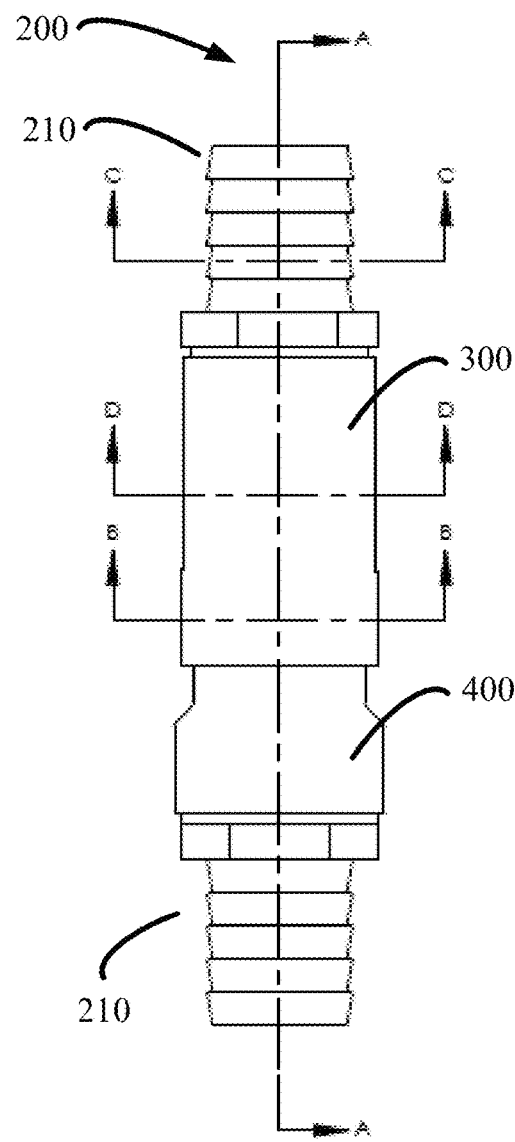
FIG. 2 schematically illustrates an embodiment of a valved connector system.

An embodiment of a valved system 200 is schematically illustrated in FIG. 2, and comprises two fittings: a female barrel 300 and a male barrel 400. When the male barrel 400 and female barrel 300 are coupled together, they form a fluid path from one conduit 103 to another conduit 103. Generally, the valved system 200 is bidirectional, in that fluid may flow in either direction through the female barrel 300 and male barrel 400, and/or may reverse direction.

Figure 3A:
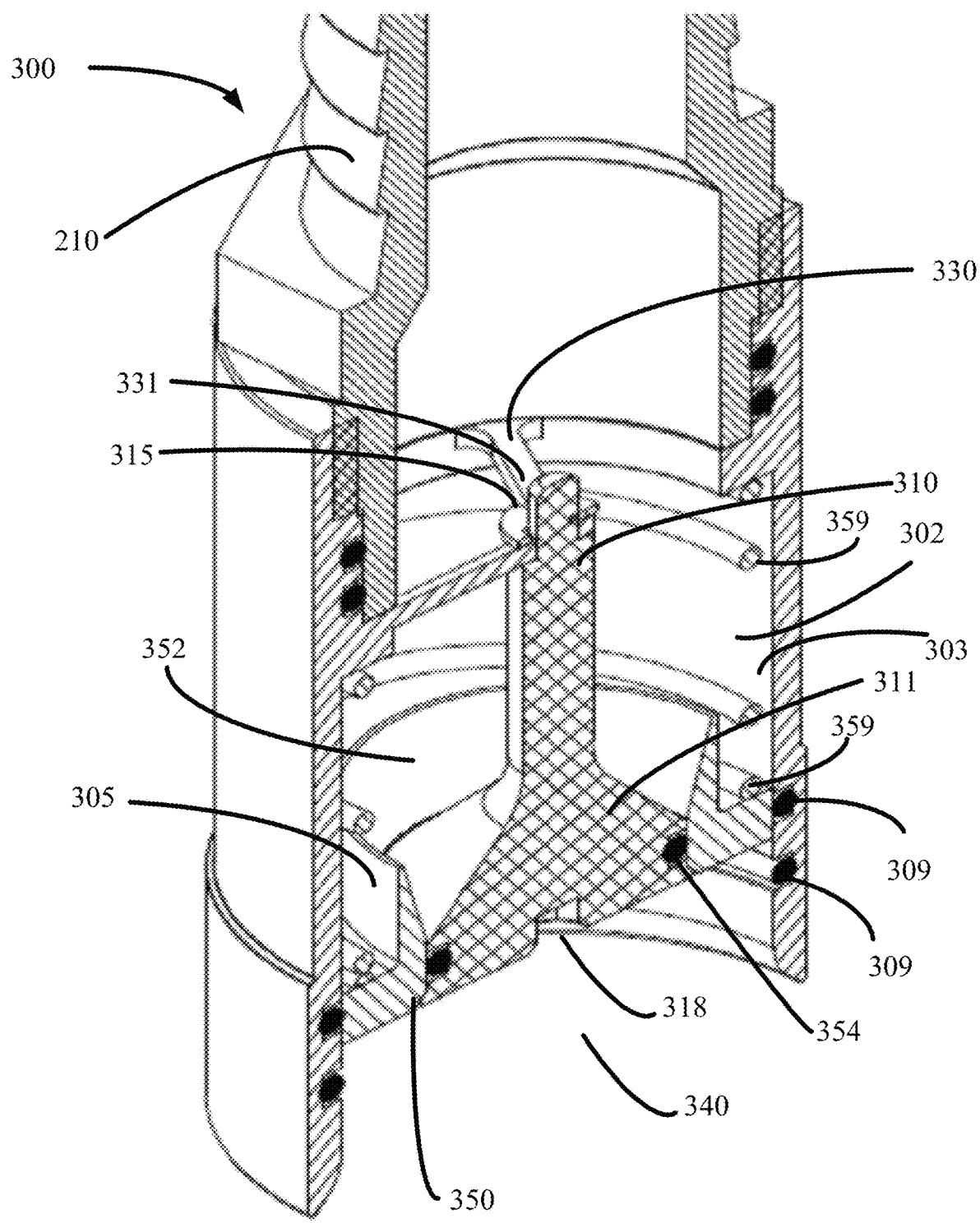
FIGS. 3A, 3B and 3C schematically illustrate an embodiment a female member of a valved connector system.
Figure 3B:
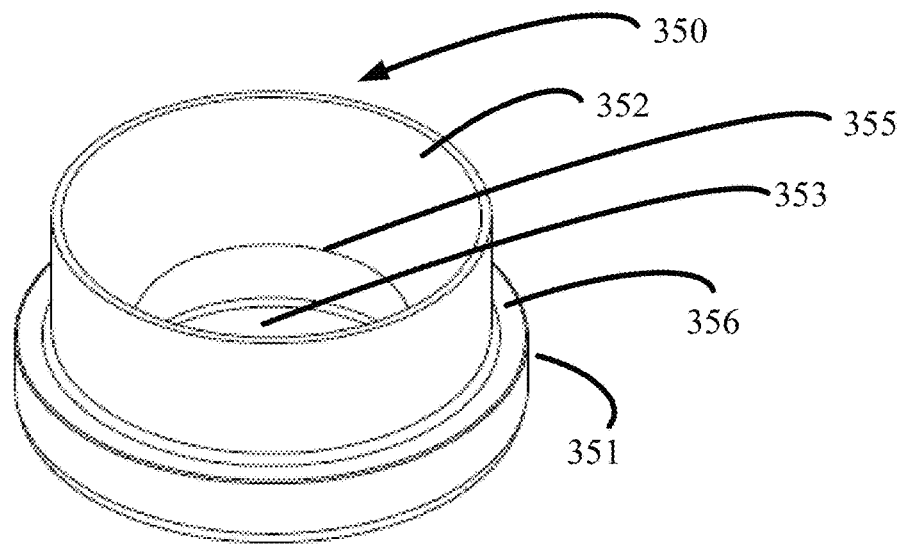
Figure 3C:
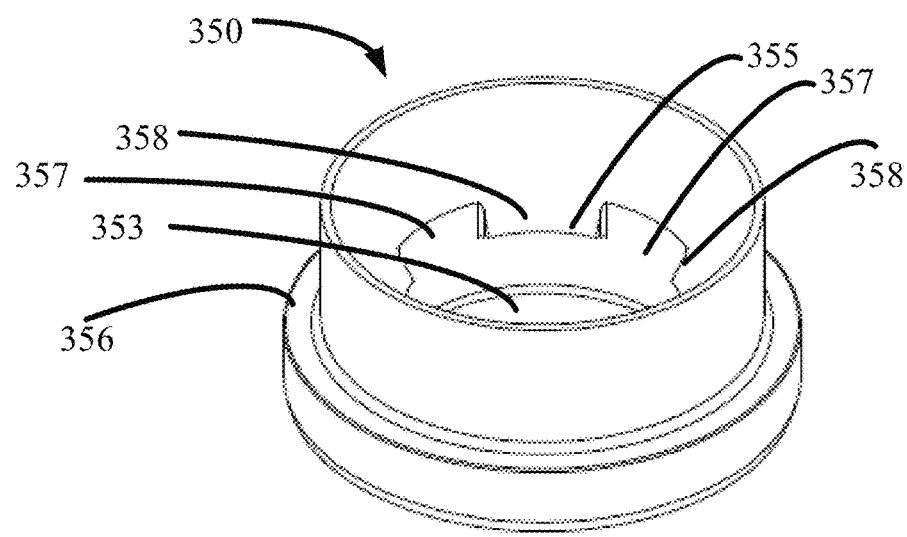

Female Barrel 300 (FIGS. 3A-3C)

FIG. 3A schematically illustrates an embodiment of a female barrel 300 having an external surface 301 and an internal sidewall 302. The female barrel 300 in this embodiment includes an optional nozzle 210 in fluid communications with an interior 303 of the female barrel. The female barrel 300 in this embodiment has a cylindrical shape with a circular cross-section, but other embodiments may have non-circular shapes, including for example an oval shape or rectangular shape.

The female barrel 300 also includes a first mating interface 340 configured to sealingly mate with an opposing interface of another barrel. For example, the opposing interface may be a second interface of a male barrel as discussed below.

The female barrel 300 also includes one or more gaskets 309, which in the embodiment of FIG. 3A are O-rings. The gasket 309 is sheltered within the female barrel 300 such that the gasket 309 is not directly exposed to the exterior of the female barrel 300, even when the female barrel 300 is not coupled to another barrel. When the female barrel 300 is coupled to another barrel, such as male barrel 400 described below, the gasket 309 sealingly engages with an external surface (e.g., surface 401) of the other barrel 400 so as to prevent fluid from escaping between the inner side wall 302 of the female barrel 300 and the external surface 401 of the other barrel 400.

A stem 310 is suspended within the barrel 300 so as to be in fixed relationship with the barrel 300. The stem 310 in this embodiment is suspended from a retainer 330 affixed to the inner side wall 302 of the female barrel 300. The retainer 330 includes a retaining aperture 331 into which the stem 310 is secured. To that end, the stem 310 may include a clip groove 314 configured to receive a clip 315, such as a C-clip for example.

The stem 310 is not movable with respect to the first mating interface 340. The stem 310 includes a flared projection 311 suspended within a wider portion 305 of the barrel 300. The wider portion 305 may be referred-to as an "expansion chamber" in that its width expands (e.g., relative the area of the cross-section of sections of the barrel 300 on either side of the wider portion 305, to allow more space for fluid to flow around the flared projection 311), although the area of its cross-section may be these same as, or substantially the same as, the area of the cross-section of sections of the barrel 300 on either side of the wider portion 305.

The flared projection 311, which may be cone-shaped, defines a radial volume 312 within the female barrel 300, and in some embodiments within the wider portion 305 of the female barrel 300. For example, some embodiments have a flared projection 311 with a circular cross-section, in which the radial volume is annular.

The female barrel 300 also includes a poppet 350 movably disposed within the female barrel 300. The poppet 350 generally has a radial surface 351 having the same shape as the inner side wall 302 of the female barrel 300, and the radial surface 351 sealingly engages the inner side wall 302 so as to prevent or retard flow of fluid between the poppet 350 and inner side wall 302. Two embodiments of a poppet 350 are schematically illustrated in FIG. 3B and FIG. 3C.

The poppet 350 also has an aperture 353, defined by an interior poppet wall 352, in an axial direction through the poppet 350. The aperture 353 allows fluid to flow through the poppet when the aperture 353 is not occluded, for example by the flared projection 311. A ridge 355 within the aperture 353 engages the flared projection 311 to prevent the poppet 350 from sliding past the flared projection 311.

In some embodiments, the interior poppet wall 352 includes crenellation tabs 358 spaced apart from one another with intervening gaps. The crenellation tabs 358 define gaps 357 between them. The gaps 357 increase the cross-section of the aperture 353 to allow greater fluid flow through the aperture 353 when the poppet 350 is not sealingly engaged with the flared projection 311. In some embodiments, the gaps 357 facilitate smoother fluid flow through the poppet 350.

A poppet spring 359 engages landing 356 and biases the poppet 350 to sealingly engage the flared projection 311, so as to prevent fluid flow through the poppet 350. In this way, the poppet 350 and the flared projection 311 cooperate to form a valve and seal the female barrel 300. In some embodiments, when the female barrel 300 is sealed, the first mating interface remains open so that fluid remaining in the first barrel between the first mating interface, and the stem and flared projection described below, may drain from the female barrel 300.

Figure 3D:
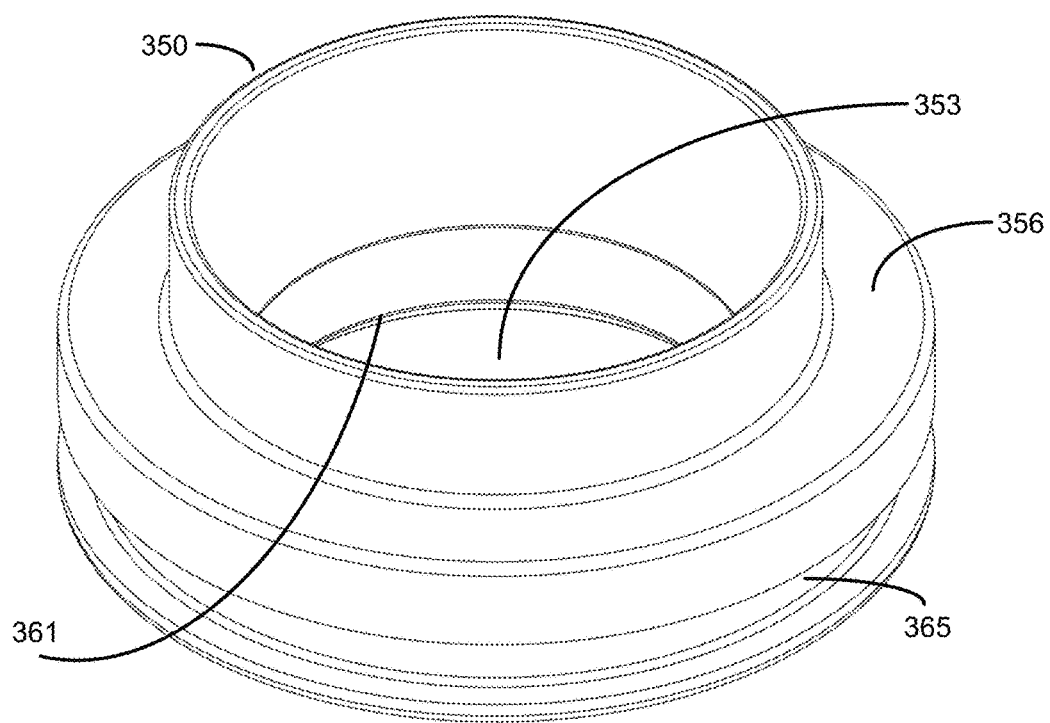
FIGS. 3D and 3E schematically illustrate another embodiment of a poppet.
Figure 3E:
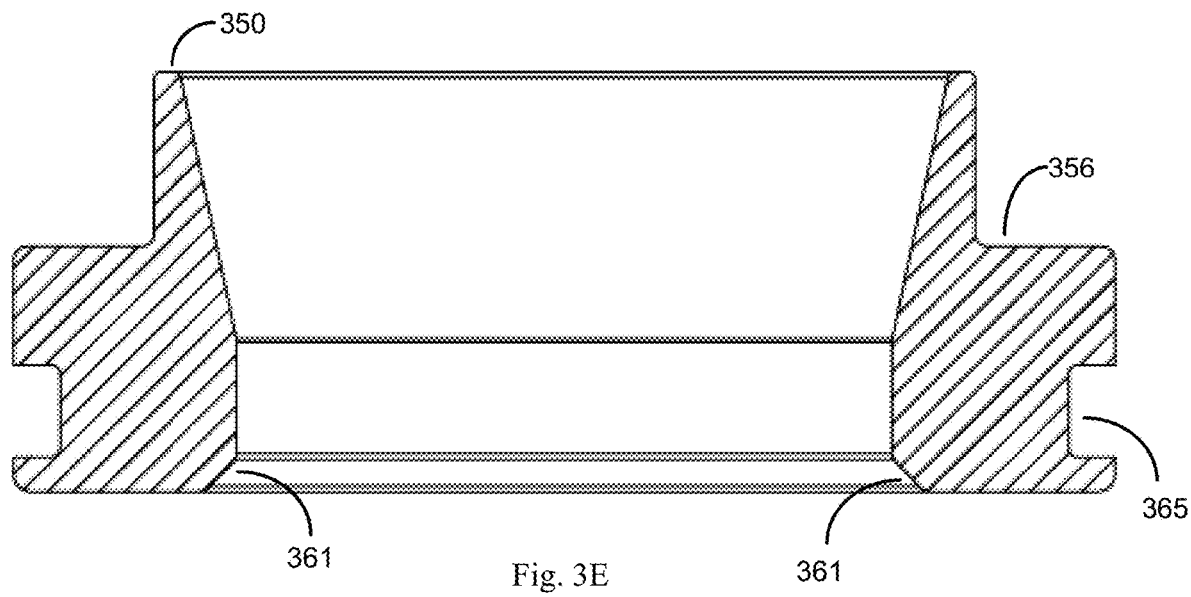

FIG. 3D and FIG. 3E schematically illustrate another embodiment of a female poppet 350. This embodiment includes a radial poppet groove 365 configured to receive and hold a seal 366 (schematically illustrated in FIG. 7A). In operation the seal 366, which may be an O-ring, engages the inner side wall 302 of the female barrel 300, to seal between the poppet 350 and sidewall 302 when the poppet 350 is engaged with the flared projection 311, and even as the poppet 350 moves axially within the female barrel 300.

The female poppet 350 of FIG. 3D and FIG. 3E also has a chamfered edge 361 configured to align the poppet 350 with the flared projection 311 as the poppet 350 moves axially to engage the flared projection 311.

Figure 3F:
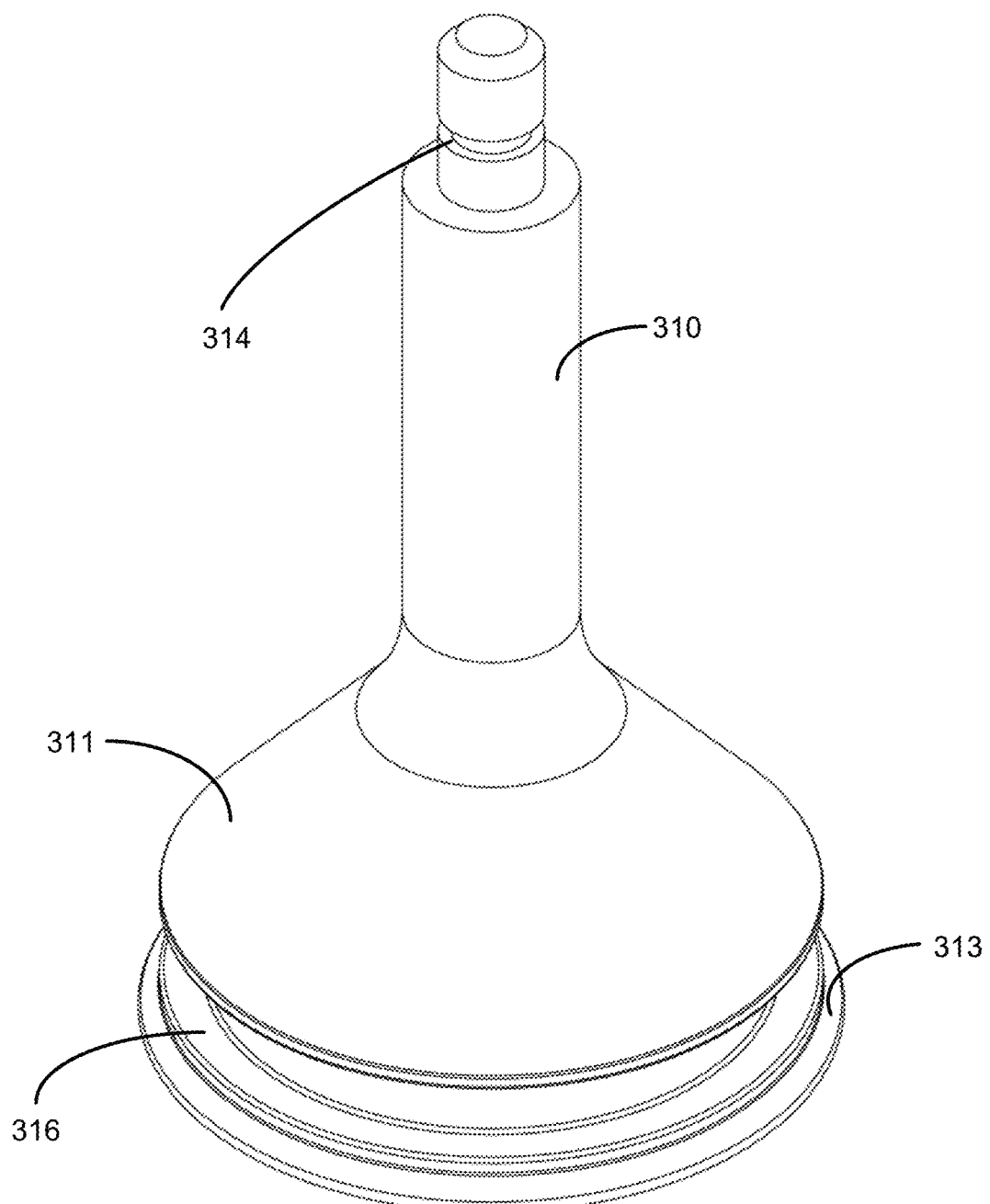
FIG. 3F schematically illustrates another embodiment of a stem.

FIG. 3F schematically illustrates another embodiment of a stem 310. In this embodiment, the flared projection 311 shows a stem seal groove 316 configured to receive the seal 354.

The stem 310 of FIG. 3F also includes a lip 313 radially around the flared projection 311. The lip 313 engages the female poppet 350 to prevent the female poppet 350 from sliding axially past the flared projection 311. In addition, if the female poppet 350 includes a chamfered edge 361, the chamfered edge 361 engages the lip 313 and helps guide the female poppet 350 into sealing contact with the flared projection 311.

Male Barrel 400 (FIGS. 4A-4D)

Figure 4A:
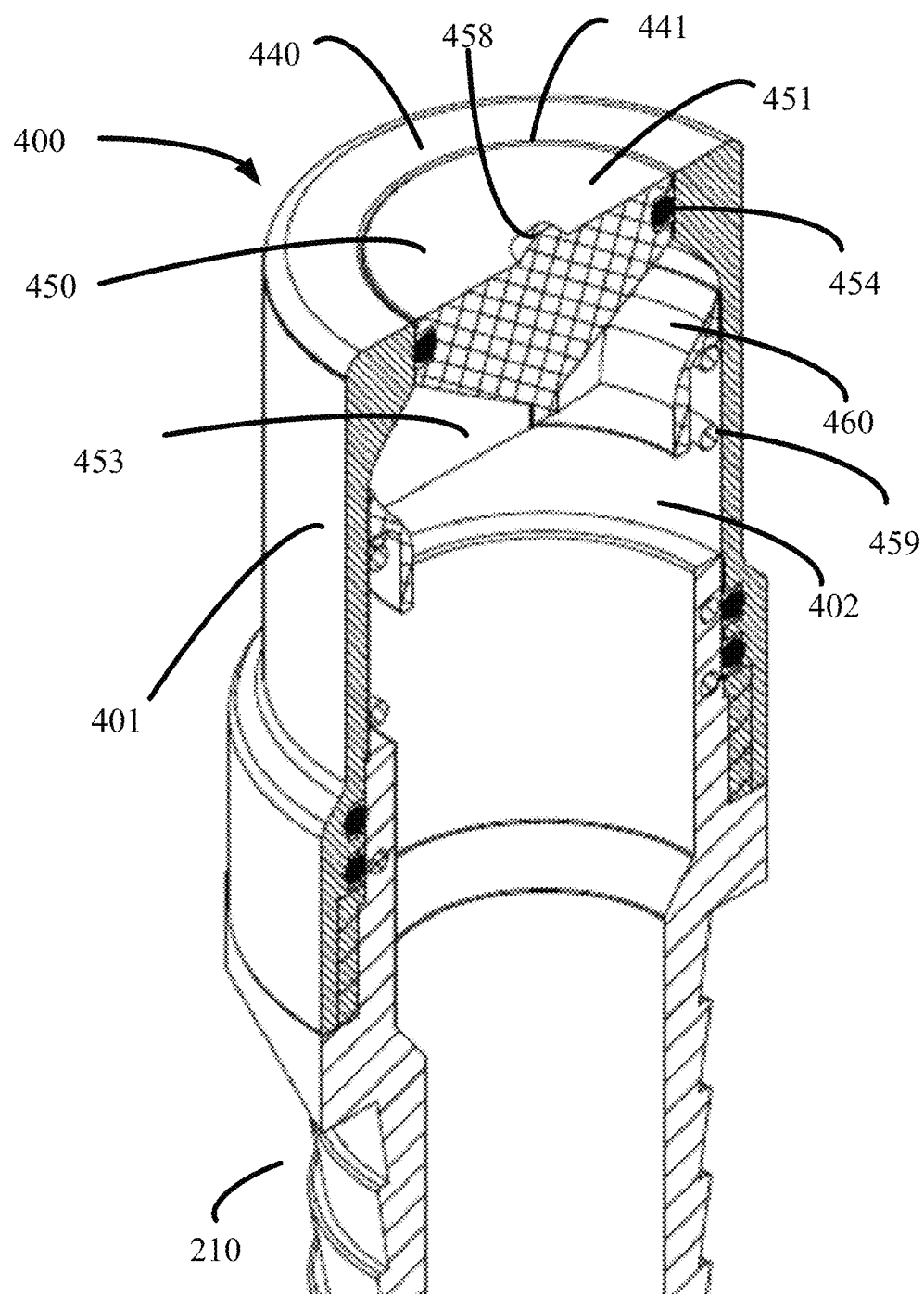
FIGS. 4A-4D schematically illustrate an embodiment a male member of a valved connector system.

FIG. 4A schematically illustrates an embodiment of a male barrel 400 having an external surface 401 and an internal sidewall 402.

The male barrel 400 in this embodiment includes an optional nozzle 210 in fluid communications with an interior 403 of the male barrel 400. The male barrel 400 in this embodiment has a cylindrical shape with a circular cross-section, but other embodiments may have non-circular shapes, including for example an oval shape or rectangular shape.

The male barrel 400 also includes a second mating interface 440 configured to sealingly mate with an opposing interface of another barrel. For example, the second mating interface 440 may mate with the first mating interface 340 of the female barrel 300 as described above. In some embodiments, the second mating interface 440 of the male barrel fits within the first mating interface 340 of the female barrel 300.

The male barrel 400 further includes a plug 450 having a T-member 451 with a top face 452 configured to sealingly mate with the second mating interface 440. For example, the top of the T-member 451 fits snugly within the aperture 441 of the second mating interface 440 to prevent, when the plug is positioned within the aperture 441, fluid from flowing through the second mating interface 440. To that end, the T-member may include a plug gasket 544.

Figure 4B:
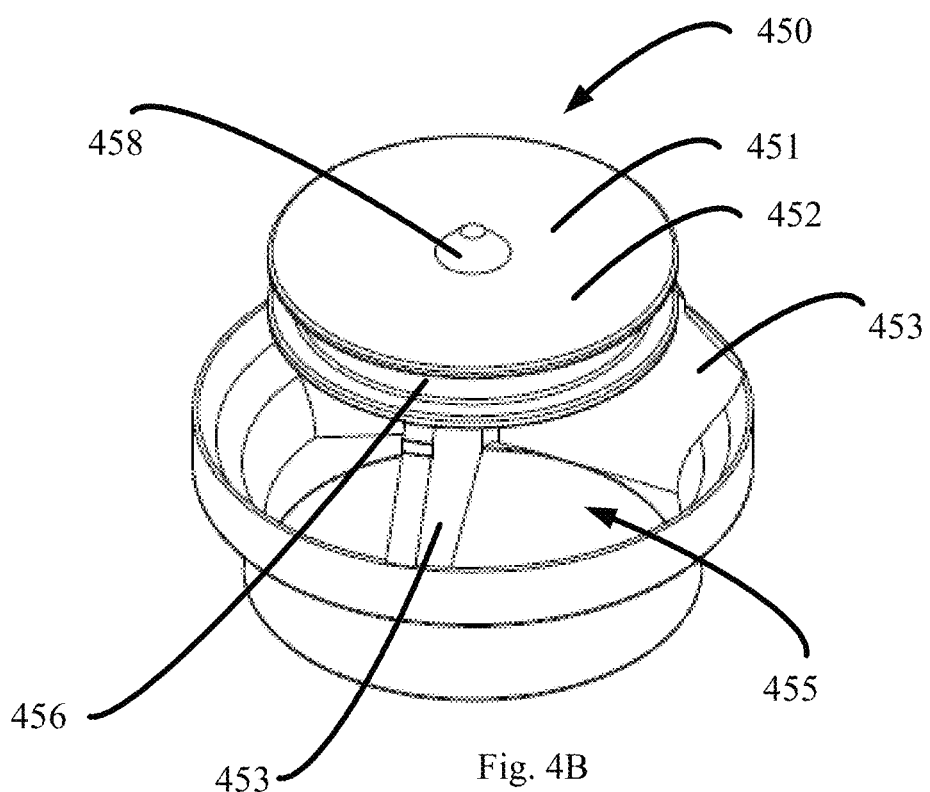
Figure 4C:
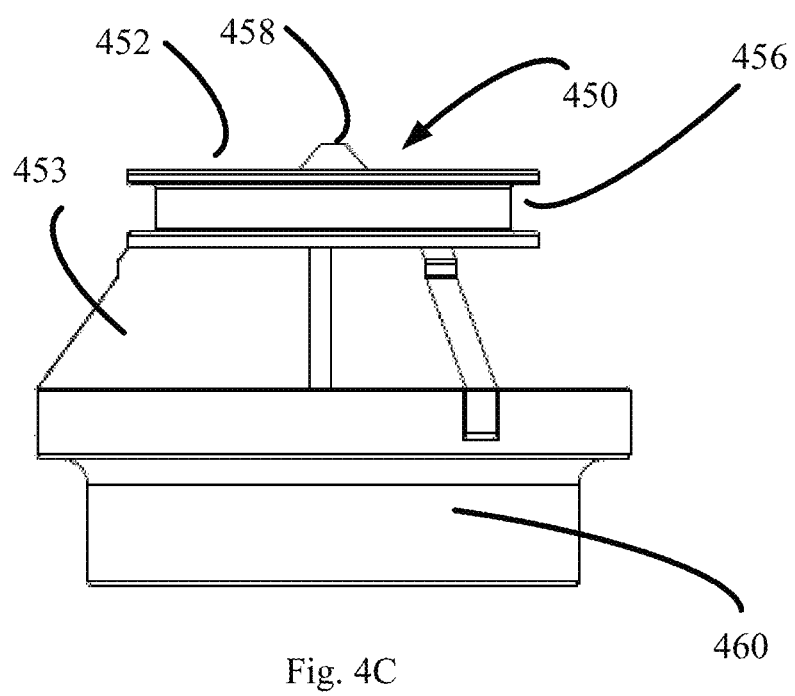
Figure 4D:
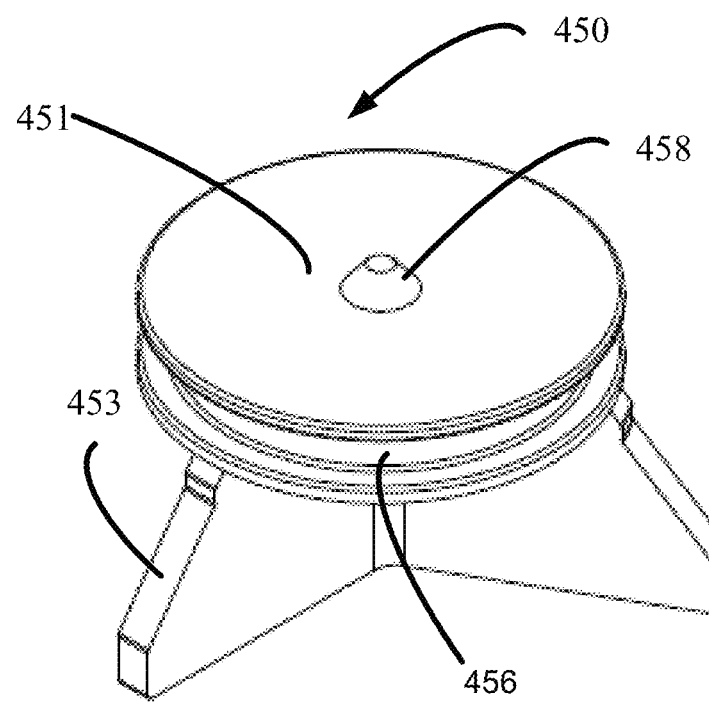
Figure 4D:
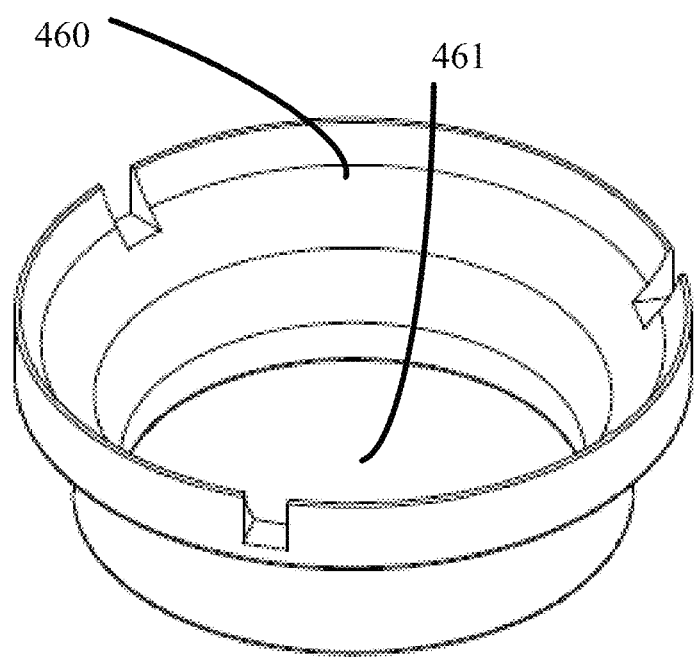

The plug 450 is coupled to, and may be integrated with, a funnel 460, as schematically illustrated in FIG. 4B and FIG. 4C. FIG. 4D schematically illustrates the plug 450 separated from the funnel 460 to facilitate illustration of certain features.

The plug 450 includes legs or vanes 453 that cooperate with the funnel 460 to define one or more apertures or passages 455 through to the funnel aperture 461, so as to provide a fluid path through the funnel 460 and past the plug 450 when the plug 450 is not sealingly engaged with the second mating interface 440. In some embodiments, the passages 455 have, in the aggregate, an area in cross-section equal to the area of the funnel aperture 461.

The funnel aperture may have, in some embodiments, a cross-sectional area (e.g., normal to the axis of the male barrel and to the fluid path) equal to a cross-sectional area of the female barrel 300.

A plug spring 459 biases the plug 450 into the aperture 441 to seal the aperture 441. In this way, the plug 450 and the aperture 441 cooperate to form a valve and seal the male barrel 400. In some embodiments, when the female barrel 300 is sealed, the second mating interface 440 remains open as the male barrel is in the process of being disengages (e.g., removed from) the female barrel 300, even after the female barrel 300 is sealed, so that fluid remaining in the female barrel may drain from the female barrel 300 into the male barrel 400.

Figure 4E:
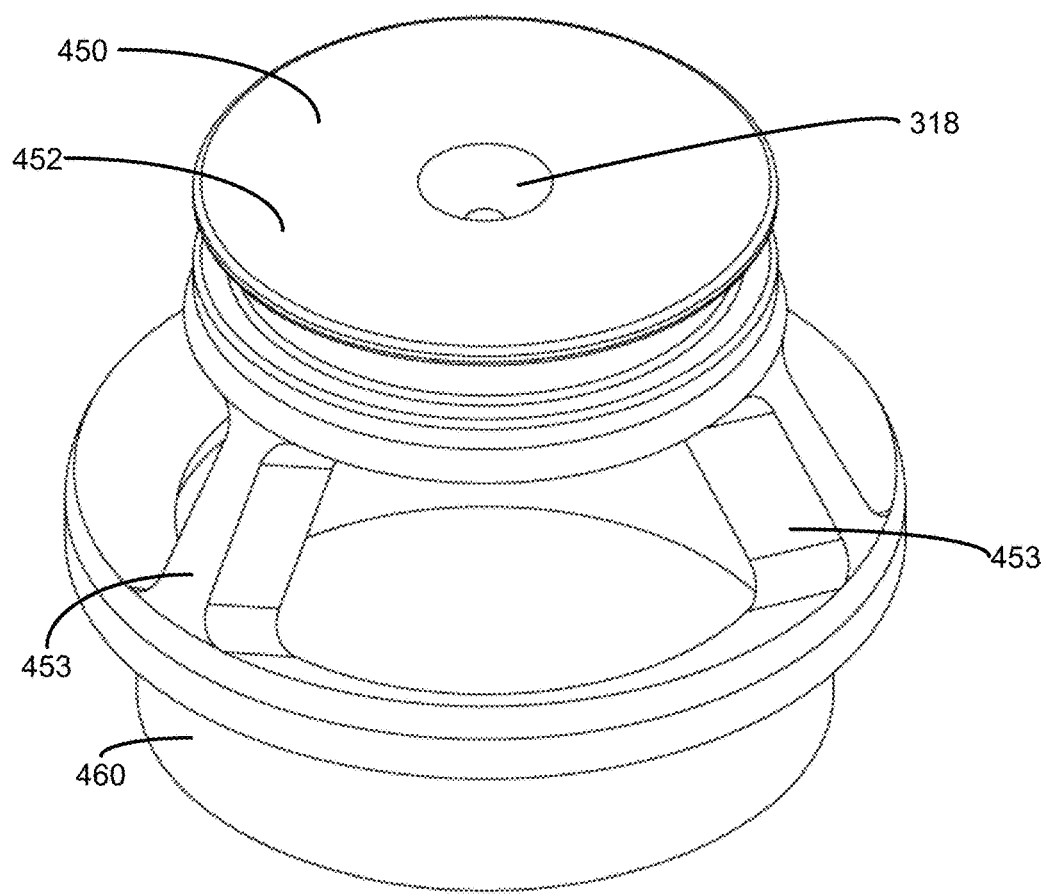
FIGS. 4E and 4F schematically illustrate another embodiment of a plug.
Figure 4F:
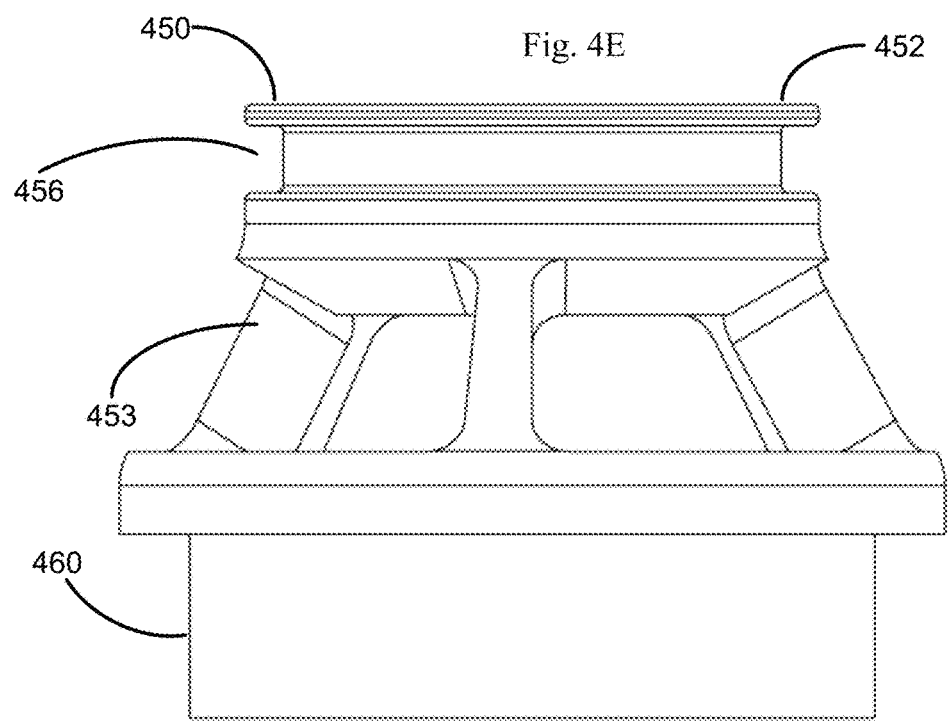

FIGS. 4E and 4F schematically illustrate another embodiment of a plug 450, and show plug seal groove 456 disposed on a radial edge of T-member 451 and configured to receive a plug gasket 454.

In the embodiment of FIG. 4E and FIG. 4F, the T-member 451 and funnel 460 form a unified body. The unified body plug 450 may be easier and/or less expensive to manufacture than multiple-piece embodiments. For example, the unified body plug 450 may be molded plastic, or 3D printed.

The embodiment of FIG. 4E also schematically illustrates an alignment recess 318 in the top face 452 of the plug 450. When the plug 450 engages a stem 310 having an alignment post 458, the alignment post 458 engages the alignment recess 318 to guide the plug 450 and stem 310 into alignment. In some embodiments, the alignment post 458 has sloped sides, and may be a frustum of a cone. In such embodiments, the sloped sides of the alignment post engage an edge or sides of the alignment recess 318 and guide the alignment post 458 into the alignment recess 318, and thereby align the stem 310 and plug 450. Other embodiments have an alignment post 458 on the male plug 450 configured to engage an alignment recess on a stem 310, as schematically illustrated in FIG. 5A for example.

Figure 4G:
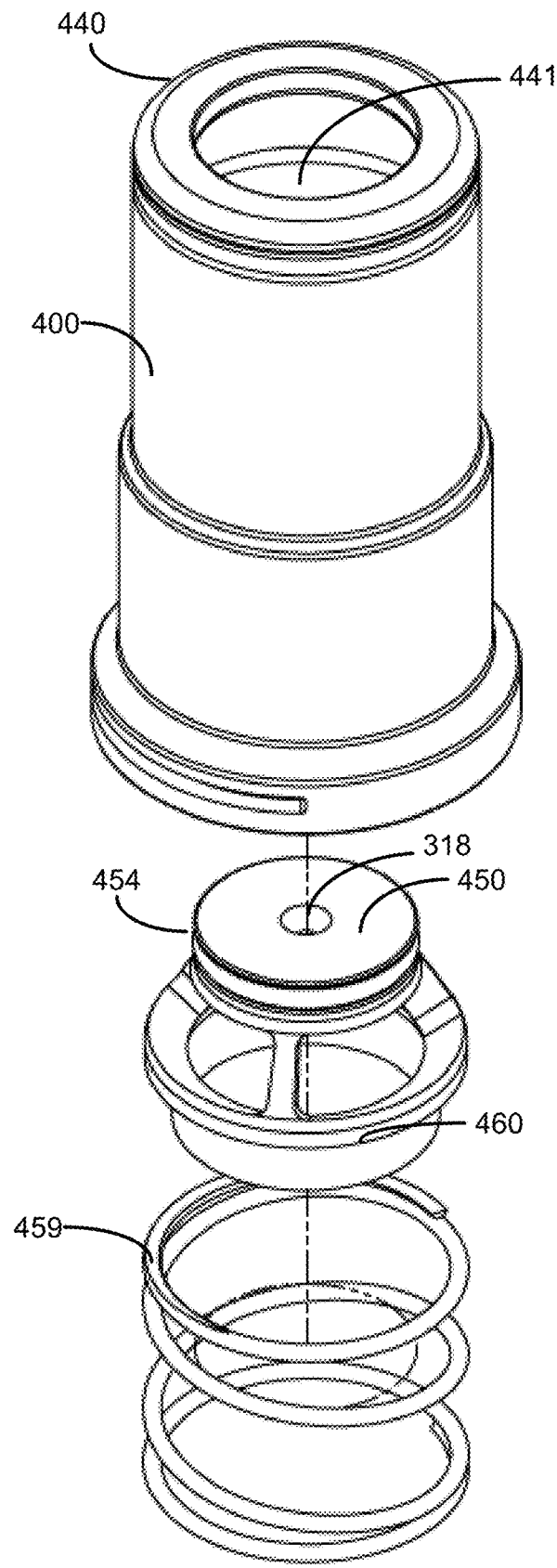
FIG. 4G schematically illustrates another embodiment of a male fitting.

FIG. 4G schematically illustrates another embodiment of a male barrel 400. This embodiment does not have the optional nozzle 210

System in Open Configuration (FIGS. 5A-5D)

FIG. 5A schematically illustrates a cross-section of valved system 200 when a female barrel 300 is mated with a male barrel 400 such that a fluid path through the valved system 200 is open.

As shown, the male barrel 400 has pushed the poppet 350 in an axial direction away from the flared projection, thereby opening the radial volume 312 so that fluid may flow past the flared projection.

The flared projection 311 has, in turn, pushed the plug 450 away from the aperture 441 and into the male barrel 400, thereby opening the aperture 441 so that fluid may flow into and/or out of the male barrel 400.

FIGS. 5B-5D schematically illustrate cross-sections, in a plane normal to the axial flow path through the barrels 300 and 400, of various portions of an embodiment of a valved system 200.

A cross-section 510 of the female barrel 300 is schematically illustrated in FIG. 5B, and shows a cross-section of the flared projection, and the radial volume (in this embodiment, an annular radial volume) 312.

A cross-section 520 of the nozzle 210 is schematically illustrated in FIG. 5C. As can be seen in FIG. 5C, the interior cross-section of the bore 212 of the nozzle 210, though which fluid may flow, has a cross-section (in this embodiment, a circular cross-section). The bore's cross-section has an area equal to the area of the annular volume 312.

FIG. 5D schematically illustrates a cross-section 530 of a female barrel 300, including a cross-section of the stem 310, and revealing the retainer 330. The retainer 330 includes radial beams 333 coupled to a rim 332. The rim 332 is secured to the interior of the female barrel 300, such that the retainer 330, and the stem 310 and flared projection, are fixedly suspended within the female barrel 300.

Figure 5E:
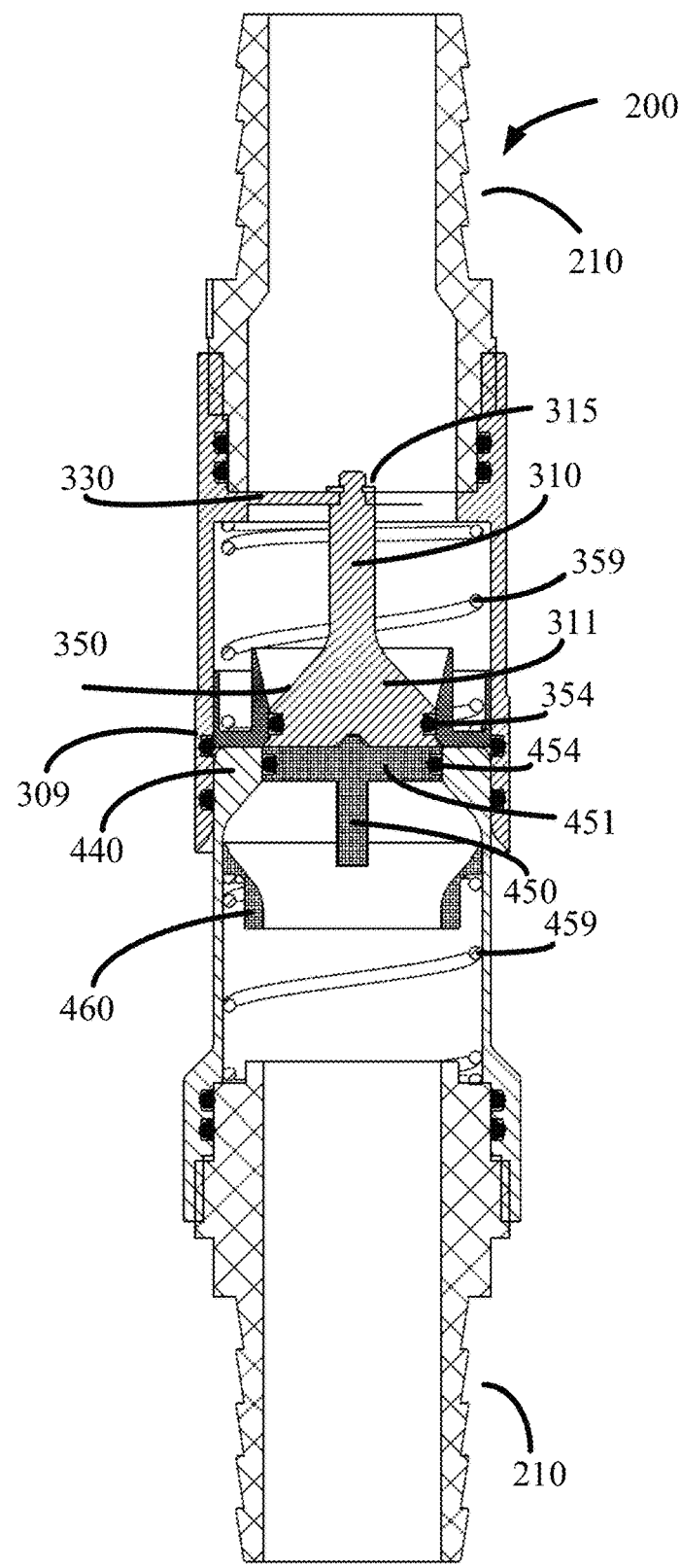
FIG. 5E schematically illustrates and embodiment a valved connector system in the closed configuration.

System in Closed Configuration (FIG. 5E)

FIG. 5E schematically illustrates a cross-section of valved system 200 when a male barrel 400 is partly, but not yet completely, withdrawn from the female barrel 300, such that a fluid path through the valved system 200 is closed.

As shown in FIG. 5E, the poppet 350 has moved down the female barrel, relative to its position in FIG. 5A, such that the flared projection 311 is within, and occludes, the aperture 353 of the poppet 350. In this configuration, one or more O-rings 354 on the flared projection 311 engage a portion of the interior wall 352 of the poppet 350, thus forming a seal through which fluid may not pass. Consequently, in this configuration, the female barrel 300 is sealed.

As also shown in FIG. 5E, the plug 450 has moved into the aperture 441 of the male barrel 400, so as to occlude the aperture 441.

In this configuration, one or more O-rings 454 on the plug 350 engage a portion of the inner side wall 402 of the male barrel 400, thus forming a seal through which fluid may not pass. Consequently, in this configuration, the male mating interface 440 is sealed.

FIGS. 6A-6D schematically illustrate embodiments of a flow straightener 600. Some embodiments of a system 200 may include a flow straightener 600 for reducing turbulence in a fluid flowing within a female barrel 300, male barrel 400 when coupled together to form a fluid path. Each flow straightener 600 include a rim 601 configured to engage an inner side wall of a female barrel 300 or male barrel 400. For example, a flow straightener 600 may also be a retainer 330 as describe above, and to that end, may include a retaining aperture 331 for securing a stem 310.

Each flow straightener 600 includes a grid 610 defining a plurality of apertures 620. The apertures 620 allow fluid to flow through the flow straightener 600, but dampen flow in directions other than along an axial path through the flow straightener 600, to reduce turbulence in the fluid flow. The grid 610 in FIGS. 6A-6E define apertures 620 that are square or rectangular, but could define aperture 620 in other shapes as well, such as triangular, oval, or circular, to name but a few examples. The thickness 630 of the grid 610, and the shape and dimensions of the apertures 620, may be dictated by the application to which a barrel 300 or 400 and system 200 is directed, and may depend, for example, on one or more of the type of fluid, the weight of the fluid; the speed of the fluid; the shape of plumbing upstream or downstream from the barrel 300 or 400; and/or the expected turbulence already in the fluid when it reaches a flow straightener 600. The inventors have discovered that the smaller the cross-section of an aperture 620, the greater the flow straighter 600 reduces turbulence in the flowing fluid. The inventors have also discovered that the greater the thickness 630 of the apertures 620, greater the flow straighter 600 reduces turbulence in the flowing fluid. A person having ordinary skill in the art would, based on the present disclosure, be able to determine thickness of the grid 610, and the shape and dimensions of the apertures 620, necessary or desired for a given application. One or more flow straighteners 600 may be provided within a barrel 300 and or barrel 400.

Figure 6E:
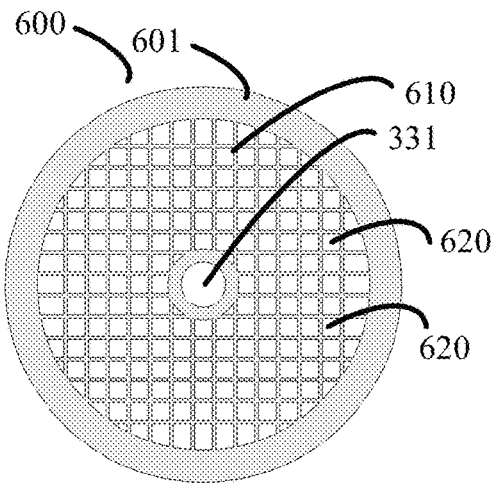
Figure 6E:
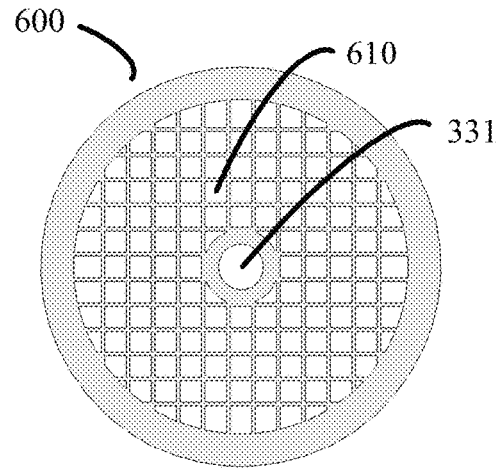
Figure 6E:
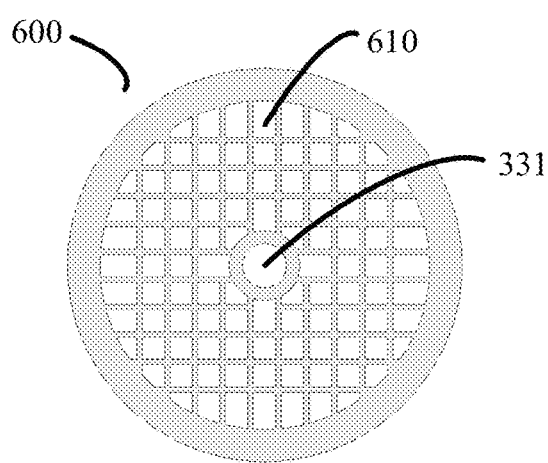
Figure 6E:
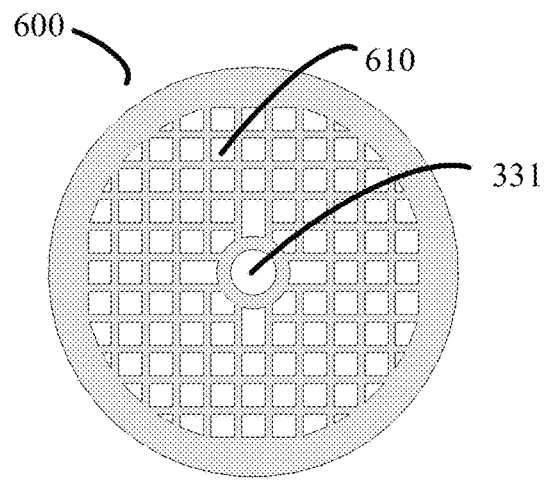
Figure 6E:
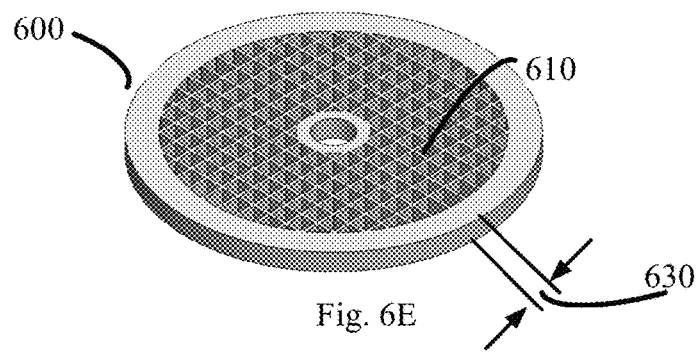
Figure 6F:
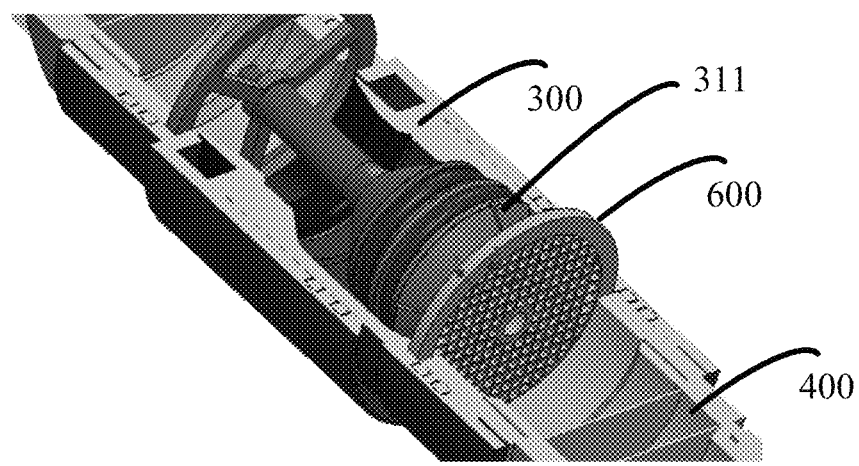
FIGS. 6F and 6G schematically illustrate embodiments of positions of flow straighteners within barrels.
Figure 6G:
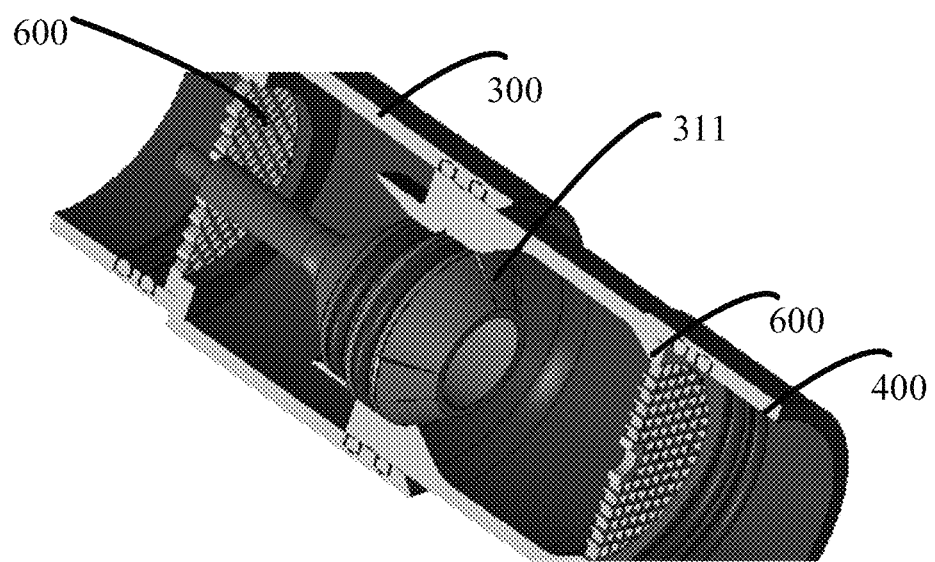

Embodiments of the female barrel 300 and the male barrel 400, and consequently the connector 200, may include one or more flow straighteners at a variety of locations. For example, FIG. 6F schematically illustrates a flow straightener 600 in the female barrel 300 adjacent to the flared projection 311, and FIG. 6G schematically illustrates an embodiment having two flow straighteners 600, one in the female barrel 300 and, in this embodiment, also acting as the retainer 330, and another in the male barrel 400.

Figure 7A:
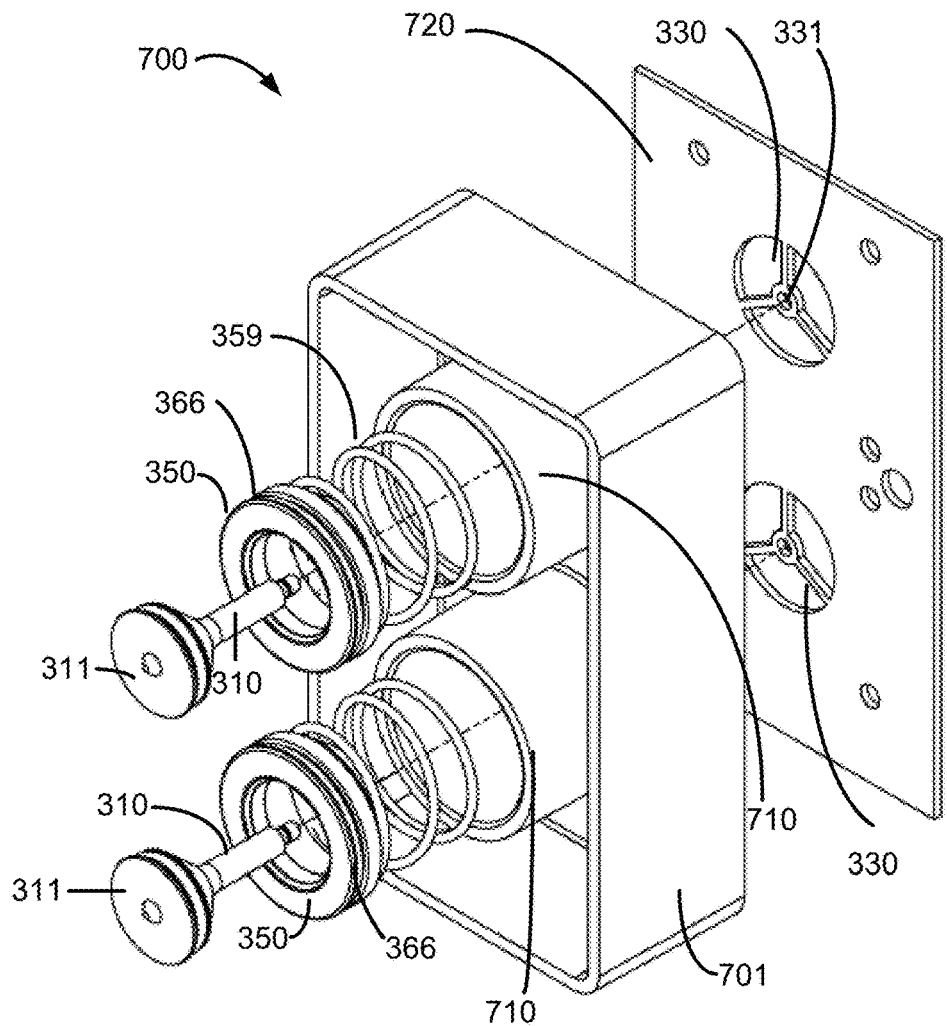
FIG. 7A schematically illustrates an embodiment a multiple female fitting.

FIG. 7A schematically illustrates an embodiment of a multiple connector fitting 700. A multiple connector fitting has a coupling body 701 having two or more connectors 710 (e.g., a plurality of connectors). The connectors 710 may be female barrels 300, male barrels 400, or a plurality of barrels including both female barrels 300 and male barrels 400.

Each of the connectors 710 is configured to fluidly couple with a corresponding connector. For example, each female barrel 300 of the coupling body 701 may couple to a corresponding male barrel 400, and each male barrel 400 of the coupling body 701 may couple with a corresponding female barrel 300.

For purposes of illustration, the multiple connector fitting 700 of FIG. 7A includes two female barrels 300 on a coupling body 701. A stem 310 is suspended within each female barrel 300 from a retainer 330, but in this embodiment the retainer 330 is not within the female barrel 300. Rather, in the embodiment of FIG. 7A, each retainer 330 is part of a retainer plate 720, which includes one or more retainers 330, corresponding to the number of female barrels 300 of the coupling body 701.

To that end, the retainer plate 720 is disposed on a side of the coupling body 701 that is opposite from the side having the female barrels 300. In the embodiment of FIG. 7A, the retainer plate 720 is sandwiched between the coupling body 701 and a manifold 730.

The multiple connector fitting 700 provides several advantages over a single fitting embodiment. For example, a two-connector fitting 700 may provide twice the fluid flow capacity as a single fitting.

Figure 7B:
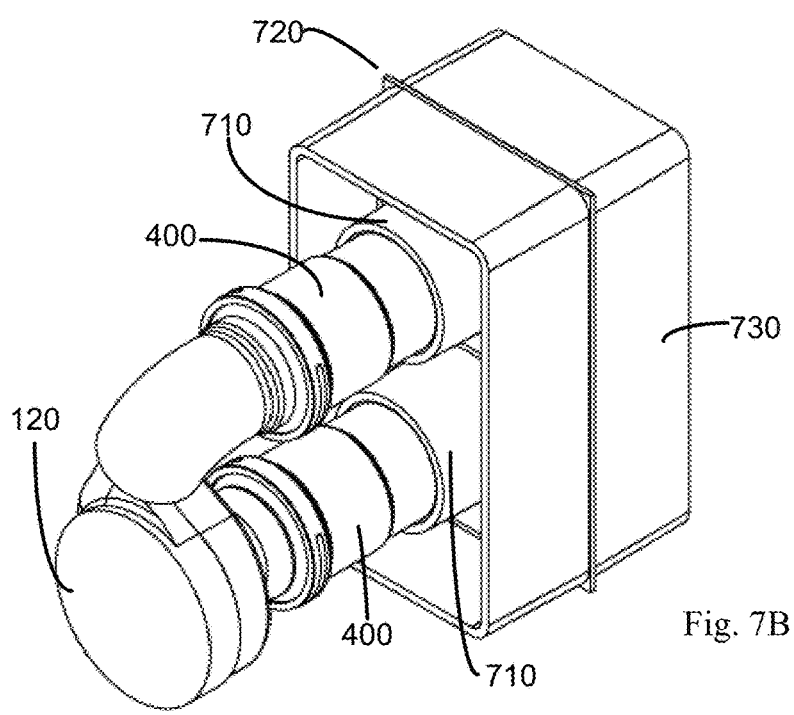
FIG. 7B schematically illustrates an embodiment a pump and male fittings engaged with a multiple female fitting.

In addition the connectors 710 of some embodiments are arranged to mate with correspondingly arranged connectors on another device. For example, in FIG. 7B, each connector 710 of the coupling body 701 is in a predetermined location relative to one or more other connectors 710 of the coupling body 701, and the connectors 710 are positioned to mate with corresponding connectors 121 on, or coupled to, a pump 210. In the embodiment of FIG. 7B, the connectors 121 on the pump 120 are coupled to the female barrels 300 of the coupling body via two male barrels 400. Such embodiments make it easier to couple the multiple connector fitting 700 to another body, particularly in blind mating, because the various connectors are pre-aligned.

Figure 7C:
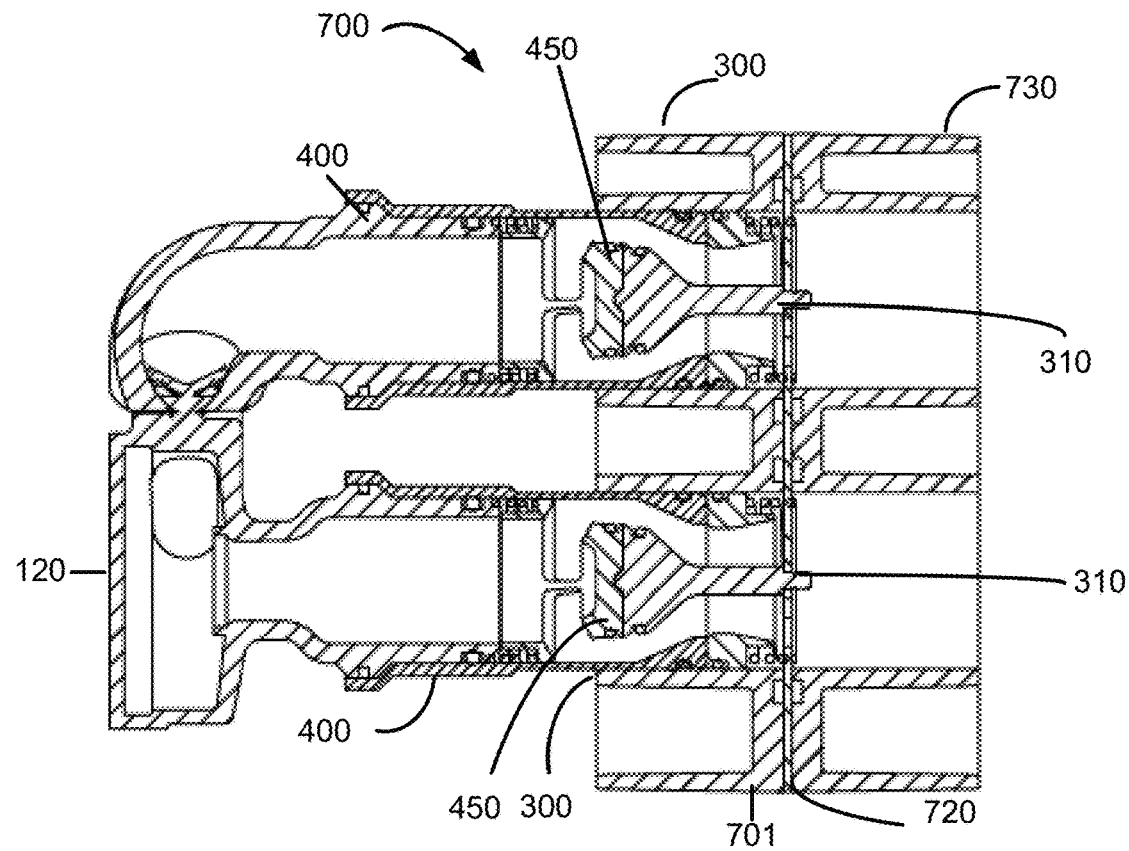
FIGS. 7C and 7D schematically illustrate cross sections of a pump and male fittings engaged with a multiple female fitting.

FIG. 7C schematically illustrates a multiple connector fitting 700 having two connectors 710 in fluid communication between a pump 120 and a cooling manifold 730. The manifold 730 is in fluid communication with the high performance computer 101. In some embodiments, the pump 120 draws cooling fluid 111 from the high performance computer 101, through a cooling manifold 730 that cools the cooling fluid 111. The cooling fluid 111 flows through a first female barrel 300, which is in fluid communication with a first male barrel 400, and into the pump 120. The pump 120 forces the cooling fluid 111 out through a second male barrel 400, which is in fluid communication with a second female barrel 300, and back to the high performance computer 101.

In other embodiments, the pump 120 draws cooling fluid 111 from the high performance computer 101 and through a first female barrel 300 and a first male barrel 400. The pump 120 forces the cooling fluid 111 out through a second male barrel 400, which is in fluid communication with a second female barrel 300, and through manifold 730 and back to the high performance computer 101.

FIG. 7C schematically illustrates the multiple connector fitting 700, the pump 120 and the manifold 730 in full fluid communication with one another. As shown for each female barrel 300, the male barrel 400 has forced the female poppet 350 to disengage from the flared projection 311 of the stem 310, and the flared projection 311 has forced the plug 450 to recede into the male barrel 400, thereby opening a fluid path through the female barrel 300 and male barrel 400.

Figure 7D:
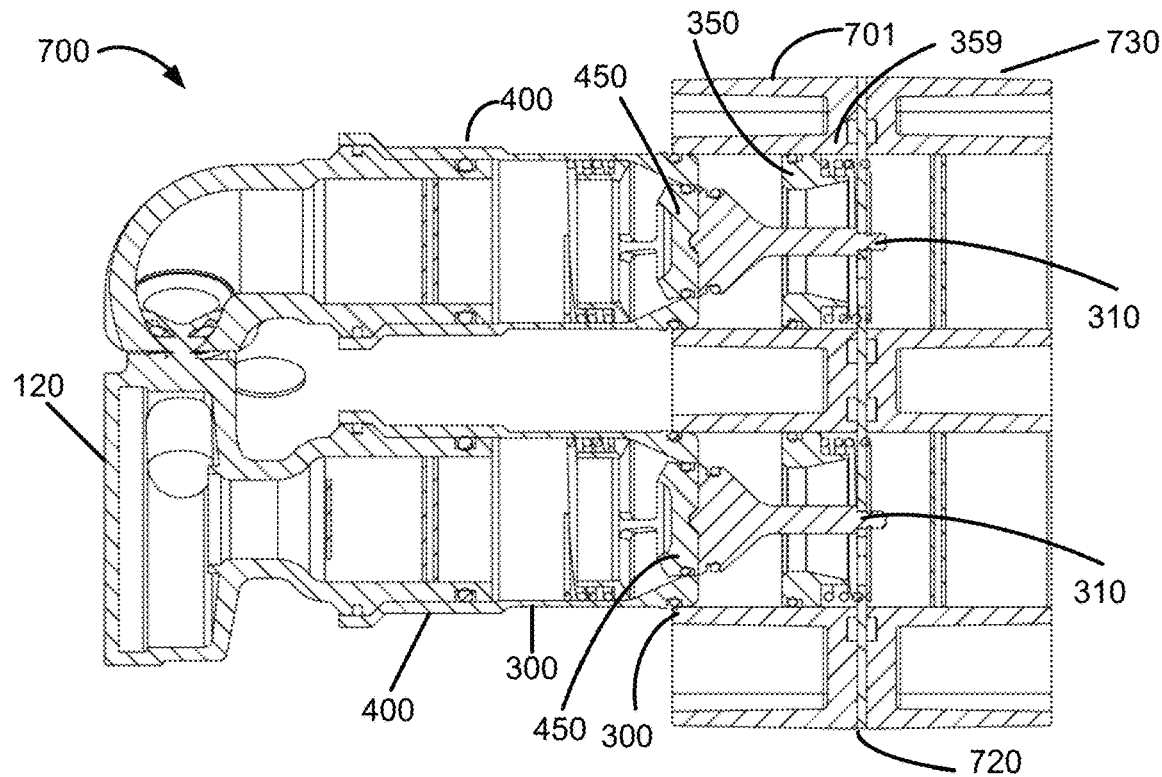

FIG. 7D schematically illustrates the multiple connector fitting 700, the pump 120 and the manifold 730 in a partially engaged (or partially disengaged) configuration. As shown, the male mating interface 440 is within the female barrel 300, but the plug 450 has moved, relative to its position in FIG. 7C, axially and is sealingly engaged with the aperture 441. The female poppet 350 has not yet moved axially within the female barrel 300 to engage the flared projection 311, but the spring 359 will cause it to do so.

Prior art systems operate at comparatively high pressures (e.g., 2500 pounds/square inch) or above, and/or may have a large pressure drop (i.e., differential pressure) across the valve. For those reasons, prior art systems use machined metal components. In such prior art systems, the seals (e.g., O-rings) must form a very tight seal between components and bodies to contain such high pressures and pressure differentials.

In contrast, the pressures at which present embodiments are used, in cooling a high performance computer 101, may be sufficiently low for plastic components to be reliable. For example, embodiments described herein may operate at pressures as low as 300 psi (2068.4 kPa), 100 psi (689.4 kPa), or even 60 psi (413.6 kPa). Also, due to the substantially constant cross section of the fluid flow through the valves, embodiments described above have relatively low pressure drop. These characteristics enable several advantages.

For example, embodiments described above may include one or more components (e.g., stem 310; female poppet 350; male poppet 450, to name but a few examples) made of plastic.

Also, the male barrel 400 and female barrel 300 may have an amount of "float" between them. In other words, the male barrel 400 and female barrel 300 may have a gap 760 between them, at least when they are not yet fully nested with one another. The gap 760 facilitates blind mating by making it easier for a user to initial entrance of a male barrel 400 into a female barrel 300.

Figure 7E:
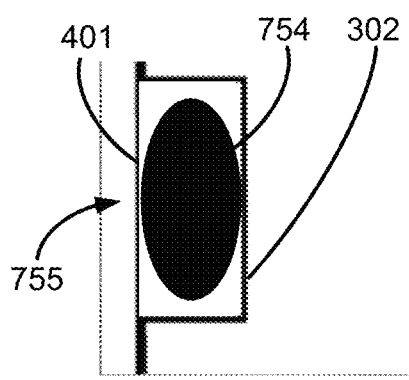
FIG. 7E schematically illustrates an embodiment a seal.
Figure 7F:
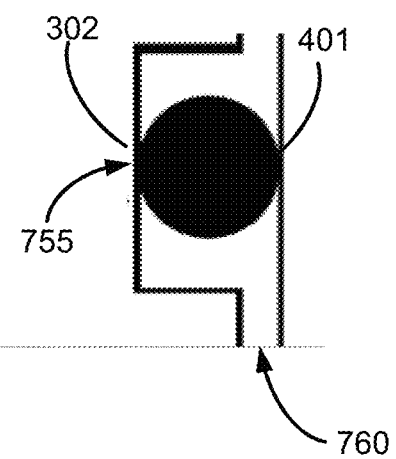
FIG. 7F schematically illustrates an embodiment a seal.

FIG. 7E and FIG. 7F schematically illustrates an embodiment of a seal in the form of an O-ring 754, such as seals 309, 354, 366, and 454 for example. The O-ring 754 has a cross section 755 that may be circular, similar to a conventional O-ring, or non-circular, such as elliptical for example. Moreover, in some embodiments, the seal may be flexible such that its cross-section 755 changes shape, expanding or contracting in various dimensions to fill the space it occupies.

For illustrative purposes, FIG. 7E and FIG. 7F schematically illustrate an O-ring seal 754 disposed within a female barrel (e.g., such as gasket 309) and between the inner side wall 302 of the female barrel 300 and the outer surface 401 of the male barrel 400.

In FIG. 7E, the cross section 755 of O-ring 754 has an oblong or elliptical, which is compressed between the outer surface 401 of male barrel 400 and the inner side wall 302. In FIG. 7F, the cross section 755 of O-ring 754 is circular and contacts both the surface 401 of the male plug 450 and the inner side wall 302 of the female barrel 300, and seals the space between them even though the male barrel 400 and the inner side wall 302 are separated by gap 760.

Consequently, the shape and flexibility of the O-ring 754 enables the O-ring 754 to create a seal even when the bodies it is sealing have float between them—e.g., are misaligned, or not yet completely nested with one another. In other words, embodiments with such seals need not be perfectly aligned or even fully engaged in order to be sealed by O-ring 754. This feature can be particularly valuable when a user is performing a blind mate of the barrels 300 and 400, because the barrels 300 and 400 can be successfully mated (blind mated) even with a degree of float between them.

The embodiments described above are intended to be merely exemplary; numerous variations and modifications will be apparent to those skilled in the art. All such variations and modifications are intended to be within the scope of the present embodiments as defined in any appended claims.

Without limiting the generality of the foregoing, it is understood that any female poppet 350 described herein can be used in combination with any female barrel 300, and/or any stem 310, described herein. Similarly, any plug (or male poppet) 450 may be used with any male barrel 400 described herein.

What is claimed is:

1. A valved connector system defining a fluid path therethrough, the valved connector system comprising:
    a female barrel comprising a first mating aperture;
    a flared projection suspended within the female barrel and defining a radial volume within the female barrel;
    a poppet disposed within the female barrel so as to be axially movable within the female barrel, the poppet including crenellation tabs spaced part from one another with intervening gaps;
    a male barrel comprising a second mating aperture configured to nestably couple with the first mating aperture; and
    a plug movably suspended within the male barrel, the plug including a T-member and a funnel, the T-member and the funnel forming a unified body, and the T-member including a plurality of legs cooperating with the funnel to define one or more fluid passages;
    wherein, when the female barrel and male barrel are nested, the male barrel forces the poppet to disengage from the flared projection so as to open a flow path through the radial volume, and the flared projection forces the plug to recede into the male barrel so as to open the second mating aperture, the female barrel and the male barrel defining a fluid path through the valved connector system.

2. The valved connector system of claim 1, further comprising a seal within the female barrel and disposed to sealingly engage an external surface of the male barrel when the female barrel and male barrel are nested, but disposed such that the seal is not exposed when the female barrel and male barrel are completely disengaged from one another.

3. The valved connector system of claim 1 configured such that, when the female barrel and the male barrel are in a process of being disengaged from one another, the poppet sealingly engages the flared projection before the plug sealingly engages the second mating aperture, such that residual fluid remaining within the female barrel after the poppet sealingly engages the flared projection may flow past the plug into the male barrel for at least some time before the plug sealingly engages the second mating aperture.

4. The valved connector system of claim 1 wherein a radial surface of the poppet sealingly engages a first inner side wall of the female barrel.

5. The valved connector system of claim 1 wherein the radial volume has an annular cross-section.

6. The valved connector system of claim 1 further comprising a nozzle in fluid communication with an interior of the valved connector system to allow fluid to enter into, or exit from, the valved connector system.

7. The valved connector system of claim 1, further comprising a flow-straightener within the male barrel or the female barrel to reduce fluid turbulence within the fluid path, the flow-straightener including a rim configured to engage an inner side wall of the male barrel or the female barrel and a grid defining a plurality of apertures.

8. The valved connector system of claim 1, wherein the poppet further includes a a ridge within an aperture defined by an interior wall of the poppet which engages the flared projection to prevent the poppet from sliding past the flared projection.

9. The valved connector system of claim 1 further comprising a stem suspended from a retaining disk within the female barrel, the stem comprising the flared projection.

10. The valved connector system of claim 9 wherein the retaining disk comprises the flow-straightener.

11. The valved connector system of claim 1 wherein the female barrel further comprises a first spring configured to bias the poppet to sealingly engage the flared projection in the radial volume.

12. The valved connector system of claim 11 wherein the first spring is a conical spring.

13. The valved connector system of claim 1 wherein the male barrel further comprises a second spring configured to bias the plug to sealingly engage the second mating aperture.

14. The valved connector system of claim 13 wherein the second spring is a cylindrical spring.

15. A valved fitting for use in a connector system, the fitting comprising:
    a barrel comprising a first mating aperture;
    a flared projection suspended within the barrel and defining a radial volume within the barrel;
    a poppet disposed within the barrel so as to be axially movable along a fluid path, the poppet including crenellation tabs spaced part from one another with intervening gaps; and
    the barrel, flared projection, and poppet configured such that, when the barrel is coupled to the second fitting, the second fitting forces the poppet to disengage from the flared projection so as to open a flow path through the radial volume, the barrel defining the fluid path therethrough for fluid flow through the valved fitting to mitigate creation of turbulence in the fluid.

16. The valved fitting of claim 15, wherein the barrel further comprises a first spring configured to bias the poppet to sealingly engage the flared projection in the radial volume.

17. The valved fitting of claim 15, wherein the radial volume has an annular cross-section.

18. A valved connector system comprising:
    a female barrel comprising a first mating aperture;
    a flared projection means suspended within the female barrel for defining a radial volume within the female barrel;
    a poppet means disposed within the female barrel so as to be axially movable along the female barrel for controllably and sealingly engaging the flared projection, the poppet including crenellation tabs spaced part from one another with intervening gaps;
    a male barrel comprising a second mating aperture configured to nestably couple with the first mating aperture; and
    a plug movably suspended within the male barrel for controllably sealing the second mating aperture, the plug including a T-member and a funnel, the T-member and the funnel forming a unified body, and the T-member including a plurality of legs cooperating with the funnel to define one or more fluid passages;

wherein, when the female barrel and male barrel are nested, the male barrel forces the poppet means to disengage from the flared projection so as to open the flow path through the radial volume, and the flared projection means forces the plug means to recede into the male barrel so as to open the second mating aperture.

19. The valved connector system of claim 18, further comprising a seal within the female barrel and disposed to sealingly engage an external surface of the male barrel when the female barrel and male barrel are nested, but disposed such that the seal is not exposed when the female barrel and male barrel are completely disengaged from one another.

20. The valved connector system of claim 18, configured such that, when the female barrel and the male barrel are in the process of being disengaged from one another, the poppet means sealingly engages the flared projection means before the plug means sealingly engages the second mating aperture, such that residual fluid remaining within the female barrel after the poppet means sealingly engages the flared projection means may flow past the plug means into the male barrel for at least some time before the plug means sealingly engages the second mating interface.

\* \* \* \* \*